UNITED STATES PATENT OFFICE.

ALBERT A. LEGGETT, OF BALTIMORE, MARYLAND.

CLEANSING AND POLISHING COMPOSITION.

1,400,826.  Specification of Letters Patent.  Patented Dec. 20, 1921.

No Drawing.  Application filed May 12, 1921.  Serial No. 469,040.

*To all whom it may concern:*

Be it known that I, ALBERT A. LEGGETT, a citizen of the United States, residing at Baltimore, in the State of Maryland, have invented certain new and useful Improvements in Cleansing and Polishing Compositions; and I do hereby declare the following to be a full, clear, and exact description of the invention, such as will enable others skilled in the art to which it appertains to make and use the same.

My invention relates to cleansing and polishing composition suitable for cleansing and polishing furniture, wood-work, japanned articles and all surfaces covered by paint or varnish.

In compounding my improved product, I take 32 parts of paraffin oil, or other suitable oil, and mix with the same 8 parts of oil of cajeput, stirring these two ingredients well together. I then mix with the compound thus formed 16 parts of alcohol, methyl alcohol being preferable on account of its cheapness, and stir the mixture well. I then mix with the resultant compound 16 parts of water and after stirring, I mix in one part of acetic acid and stir well. I then introduce 1 part of butter of antimony and stir thoroughly.

I find that this combination serves to clean painted and varnished surfaces as well as polish the same. I attribute the improved result in a large measure to the oil of cajeput which, although it is used in a small quantity, is very beneficial in enhancing the cleansing and polishing effect of my new composition.

I claim:—

1. A cleansing and polishing composition comprising an oil, an alcohol, water, an acid, butter of antimony and oil of cajeput.

2. A cleansing and polishing composition comprising a petroleum oil, methyl alcohol, water, acetic acid, butter of antimony and oil of cajeput.

3. A cleansing and polishing composition comprising 32 parts of a petroleum oil, 16 parts of methyl alcohol, 16 parts of water, 1 part of acetic acid, 1 part of butter of antimony and 8 parts of oil of cajeput.

In testimony whereof I affix my signature.

ALBERT A. LEGGETT.